United States Patent [19]

Hernqvist

[11] 3,996,527
[45] Dec. 7, 1976

[54] GAS LASER OPTICAL SYSTEM

[75] Inventor: Karl Gerhard Hernqvist, Princeton, N.J.

[73] Assignee: RCA Corporation, New York, N.Y.

[22] Filed: July 30, 1975

[21] Appl. No.: 600,508

[52] U.S. Cl. .......................................... 331/94.5 C
[51] Int. Cl.² ........................................ H01S 3/08
[58] Field of Search ................................ 331/94.5

[56] References Cited
UNITED STATES PATENTS

| | | | |
|---|---|---|---|
| 3,383,621 | 5/1968 | Luck, Jr. et al. | 331/94.5 C |
| 3,660,778 | 5/1972 | LeBlanc, Sr. | 331/94.5 C |

*Primary Examiner*—William L. Sikes
*Attorney, Agent, or Firm*—Glenn H. Bruestle; George E. Haas

[57] ABSTRACT

A laser discharge tube has a separate light reflector means positioned at each end of the tube. One of the light reflector means has a plurality of facets for reflecting the light traveling through the laser tube. The novel system defines a folded optical cavity.

7 Claims, 3 Drawing Figures

GAS LASER OPTICAL SYSTEM

BACKGROUND OF THE INVENTION

The present invention relates to gas laser optics and specifically to optics for achieving a folded laser cavity.

It is common practice in gas laser technology to achieve fundamental mode operation ($TEM_{00}$) by choosing the laser bore diameter and spherical mirror radia such that the higher order modes have diffraction loses in excess of the laser gain. This technique favors a relatively narrow bore diameter. However, in order to increase power output of the laser without making the bore diameter excessively large, the length of the tube must be increased. In many applications, it is desirable to have as short a laser tube as possible and yet maximize the power output of the device.

Another consideration when making very short laser tubes is the longitudinal mode separation with respect to the doppler width of the output. The longitudinal mode separation is defined as $c/2L$ where c is the speed of light and L is the length of the laser tube. In order to produce a gas laser having good output stability without increasing the cost of the device considerably, the longitudinal mode separation must be less than the doppler width. However, in designing relatively short laser tubes it is difficult to achieve this end. Heretofore in solid state lasers, folded optical cavities have been used to decrease the length of the laser. A folded optical cavity is one in which there are two or more light paths through the lasing medium as shown in U.S. Pat. No. 3,482,186 issued on Dec. 2, 1969 to J. P. Chernoch. However, these devices required complex alignment of three mirrors and several mode selection apertures.

SUMMARY OF THE INVENTION

An optical system for a gas laser includes a laser discharge tube having a first light reflector means at one end and a second light reflector means at the other end of the tube. The second light reflector means has a plurality of reflective facets for reflecting light traveling through the laser tube. The optical system defines a folded optical cavity.

DETAILED DESCRIPTION OF THE INVENTION

Figure 1:
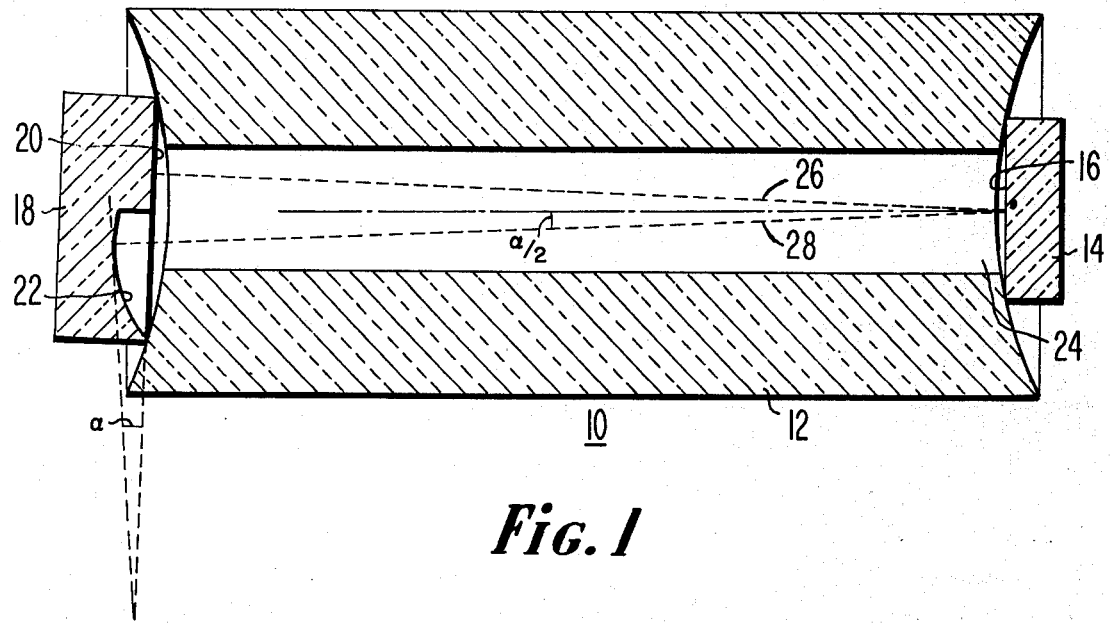
FIG. 1 is a longitudinal sectional view of a laser tube which includes one embodiment of the optical system of the present invention.

With initial reference to FIG. 1, gas laser 10 has an optical system formed with a laser discharge tube 12 having a first mirror 14 at one end of the tube 12. The gas laser 10 is shown schematically in the drawings with the conventional excitation means omitted. The first mirror 14 has a flat reflecting surface 16 which is substantially completely reflective. At the other end of the laser tube 12 is a second mirror 18. One surface of the second mirror 18 has a substantially flat reflecting facet 20 and a spherical shaped facet 22. The spherical shaped facet 22 is essentially one half of the reflecting surface of a conventional spherical laser mirror. Both the first and second mirrors 14 and 18 are formed of glass, for example, and are mounted on the ends of the laser tube 12 so that they extend across the bore 24 of the tube. Either of the mirrors 14 or 16, but preferably the spherical shaped facet 22, has appropriate light transmission to serve as the output mirror for the laser.

The facets 20 and 22 of the second mirror 18 have a predetermined relationship to one another so as to form a folded optical cavity. In order for the full width of the optical beam within the bore 24 to impinge each facet, the following equation must be satisfied:

$$\tan \alpha/2 \geq (W/2)/L \qquad (1)$$

where $\alpha$ is the angle between the tangent at the point where the light beam impinges the spherical facet 22 and the plane of the flat facet 20, W is the width of the optical beam and L is the distance between the mirrors 14 and 18. The angle of incidence of the optical beam with the first mirror is equal to $\alpha/2$. For relatively small angles equation (1) reduces to the approximation $\alpha > W/L$. In addition to the above restriction being placed upon the relationship between the facets of the second mirror 18, the laser tube bore 24 must have a diameter large enough to permit the folding of the optical path. The diameter of the bore 24 is determined by the following relationship:

$$\tan \alpha \leq D/l \qquad (2)$$

where $\alpha$ is defined above, D is the diameter of the laser bore 24 and $l$ is the length of the bore. For small angles equation (2) reduces to the approximation $\alpha < D/l$.

The tuning of the laser is relatively uncomplicated. Initially the first mirror 14 is aligned normal to the longitudinal axis of the bore 24 and then epoxied to the laser tube 12. The second mirror 18 is then tuned by orientating it on the other end of the tube 12 until maximum laser output is attained. When the second mirror 18 is properly tuned, the angle between a line normal to the flat facet 20 and a line normal to the first mirror 14 is approximately equal to $\alpha/2$. The second mirror 18 then may be epoxied to the laser tube 12.

The combination of the laser tube 12, and the first and second mirrors 14 and 18 in the alignment previously described form a folded optical cavity. Specifically, the optical beam generated within the bore 24 is reflected from the flat facet 20 of the second mirror 18 so that it travels through the bore 24 along a first path 26 until it strikes the first mirror 14. The first mirror 14 reflects the light beam folding it along a second path 28 through the bore 24. The light traveling along the second path 28 strikes the spherical shaped facet 22 whereupon due to the spherical curvature, it is reflected back along the paths just completed onto the flat facet 20. By folding the optical path into two paths 26 and 28 the effective length of the laser tube 12 has been doubled. Additional facets may be provided in the one surface of the second mirror 18 to form additional paths through the laser bore 24. In this case, the relationship between the facets will change, however, the facets at the end of the folded optical cavity must still be aligned to reflect the light beam back along the paths in order for lasing to occur. This novel optical system allows the fabrication of a relatively short laser tube while insuring that the longitudinal mode spacing of the laser is less than the doppler width of the output.

In addition, the alignment of the mirrors has been simplified over the prior art.

Figure 2:
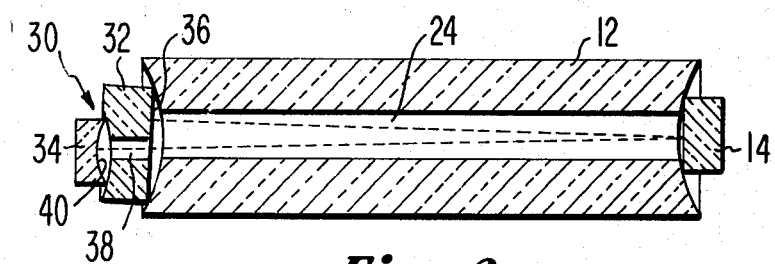
FIG. 2 is a longitudinal sectional view of a laser tube which includes a second embodiment of the present invention.

The second laser mirror 18 may be ground from a single piece of glass or be formed by bonding together two separate pieces of glass each having one of the facets 20 or 22. In either case, the second laser mirror 18 may be relatively expensive to fabricate. FIG. 2 shows an alternate fabrication of the second laser mirror. The second laser mirror 30 includes a first light reflector 32 and a second light reflector 34. The first reflector 32 has a flat reflecting surface 36 which forms the first facet of the second mirror. The first reflector 32 extends across the bore 24 of the laser tube 12. An aperture 38 extends through the first reflector 32 from the flat reflector surface 36. The second reflector 34 has a spherical reflecting surface 40 which extends across the opening of the aperture 38 on the surface opposite from the reflecting surface 36. The spherical reflecting surface 40 forms the second facet of the second laser mirror 30.

The same restrictions on the relationship of the facets and on the diameter of the bore apply to the embodiment of FIG. 2 as they do to the embodiment in FIG. 1. The optical system in FIG. 2 is aligned by initially positioning the first mirror 14 substantially normal to the longitudinal axis of the laser tube 12. The first and second reflectors 32 and 34 of the second mirror 30 are first prealigned so that the reflective surfaces 36 and 40 satisfy the facet relationship previously described. The second mirror 30 is then positioned at the end of the laser tube 12 and aligned with respect to the tube for maximum output.

Figure 3:
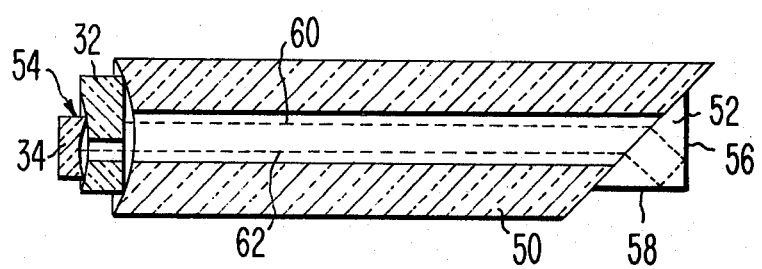
FIG. 3 is a longitudinal sectional view of a laser tube which includes yet another embodiment of the present optical system.

The embodiment of the present optical system shown in FIG. 3 includes a laser tube 50, a prism 52 and a laser mirror structure 54. One of the ends of the laser tube 50 terminates at Brewster's angle. The prism 52 has two reflective surfaces 56 and 58 and extends across the one end of the laser tube 50. The mirror structure 54, which has a first and a second reflector 32 and 34, is similar to the second mirror 30 in FIG. 2. The mirror structure 54 extends across the other end of the laser tube 50. The first reflector 32 of the mirror structure 54 is substantially normal to the longitudinal axis of the tube 50. The prism 52 forms a reflector at the one end of the laser tube which translates the path of the reflective beam so as to form two parallel beams 60 and 62. The use of parallel beam paths 60 and 62 rather than the V shaped paths 26 and 28, eliminates the restrictions on the angular relationship of the two facets of the mirror 54 and also the restriction upon the diameter of the bore of the laser tube.

By way of example, the optical systems described herein have a flat or a spherical mirror at the terminating points of the folded optical cavity. However, the present invention is not limited to this specific mirror configuration but applies equally well to a number of mirror configurations commonly known in the laser art, such as a spherical mirror at both terminating points. In addition, the first mirror 14 may have a curved reflecting surface as allowed by the well known criteria for stable laser cavity configurations.

I claim:
1. In a laser, an optical system comprising:
    a laser discharge tube;
    a first light reflector means having a single reflective surface at one end of the tube; and
    a second light reflector means at the opposite end of the laser tube, the second reflector means having a plurality of facets for reflecting the light traveling through the laser tube so as to form a folded optical cavity.
2. The system as in claim 1 wherein the second reflective means has a substantially flat facet and a partially spherical facet.
3. The system as in claim 2 wherein the second reflector means comprises:
    a first mirror having a reflective surface, and an aperture extending therethrough from the reflective surface; and
    a spherical mirror mounted on the surface of the first mirror opposite to the reflective surface and extending over the aperture.
4. The system as in claim 3 wherein the reflective surface of the first mirror is substantially flat.
5. The system as in claim 1 wherein the first reflector means comprises a flat mirror.
6. The system as in claim 1 wherein the first reflector means is substantially completely reflective.
7. In a laser, an optical system comprising:
    a laser discharge tube;
    a light reflector means at one end of the tube;
    a mirror at the other end of the tube, the mirror having a reflective surface and an aperture which extends therethrough from the reflective surface; and
    a spherical mirror mounted on the surface of the mirror opposite the reflective surface and extending over the aperture.

* * * * *